(12) United States Patent
Lee et al.

(10) Patent No.: US 7,197,943 B2
(45) Date of Patent: Apr. 3, 2007

(54) FLOW METER WITH COVER PLATE HAVING RUBBER FILLING PLATE WITH RECESSIONS

(75) Inventors: Ren-Guey Lee, Tucheng (TW); Dong-Lin Chuang, Wuqi Town (TW); Hsi-Wen Wang, Jhongli (TW)

(73) Assignee: Metertek Technology Inc. (TW)

( * ) Notice: Subject to any disclaimer, the term of this patent is extended or adjusted under 35 U.S.C. 154(b) by 46 days.

(21) Appl. No.: 11/071,185

(22) Filed: Mar. 4, 2005

(65) Prior Publication Data

US 2005/0204828 A1 Sep. 22, 2005

(30) Foreign Application Priority Data

Mar. 18, 2004 (TW) .............................. 93204086 U

(51) Int. Cl.
G01F 1/44 (2006.01)
(52) U.S. Cl. .................................. 73/861.63
(58) Field of Classification Search ............ 73/861.52, 73/861.58, 861.64
See application file for complete search history.

(56) References Cited

U.S. PATENT DOCUMENTS

| | | | | |
|---|---|---|---|---|
| 3,387,214 A | * | 6/1968 | Meyer | 455/301 |
| 4,237,739 A | * | 12/1980 | Owen et al. | 73/861.63 |
| 4,760,335 A | * | 7/1988 | Lindberg | 324/758 |
| 5,672,832 A | * | 9/1997 | Cucci et al. | 73/861.52 |
| 6,745,996 B1 | * | 6/2004 | Guthrie | 251/129.04 |
| 2002/0163953 A1 | * | 11/2002 | Yu | 374/131 |

* cited by examiner

Primary Examiner—Harshad Patel
(74) Attorney, Agent, or Firm—Bacon & Thomas PLLC

(57) ABSTRACT

A flow meter comprising a tubular main-body and a cover plate formed by printed circuit board which carries two pressure sensing devices tightly packed by soft rubber material for sensing the pressure head of and the pressure difference between the inlet and outlet of the flow meter. Since the cover plate is mounted on, and fastened to the main-body by fastening screw, but not by adhesive to form a complete unit, the cover plate can therefore bear high fluid pressure without crack or damage, i.e., shall increase the capacity of bearing pressure, the service life and accuracy, and decrease the occurrence of malfunction to the flow meter.

18 Claims, 4 Drawing Sheets

FLOW METER WITH COVER PLATE HAVING RUBBER FILLING PLATE WITH RECESSIONS

BACKGROUND OF THE PRESENT INVENTION

1. Field of the Present Invention

The invention relates to a flow meter, particularly the flow-meter having two pressure sensing devices.

2. Description of Prior Act

Shown in FIG. 1 is the conventional type flow meter (10) having a venturi tube structure formed inside the tubular main-body wherein the inlet (13) of the tubular main-body has a convergent inner diameter while the outlet (14) of the tubular main-body has a divergent inner diameter, and a transitional neck portion is formed between the inlet portion (13) and the outlet portion (14) so as to form the venturi tube structure inside the tubular main-body (11).

As for the application, the major function of the conventional flow meter (11) is to measure pressure head ($P_1$) at the inlet (13) and the pressure head ($P_2$) at the outlet (14) near the neck of the venturi tube, and obtain the value of pressure difference ($P_1-P_2$) between the fluid pressure at inlet (13) and outlet (14), and then an microcomputer is employed for converting the pressure difference ($P_1-P_2$) into flow rate and flow speed measurement which are then displayed by digital display unit.

Moreover, in order to measure the pressure difference ($P_1-P_2$) existing near the neck portion of the tubular main-body (11) a platform (12) is provided on the outer surface of the tubular main-body (11) having a small penetrating hole (15) arranged on the platform (12) and connected to the convergent portion of the inlet (13) of the tubular main-body; And, a recession is formed on the platform (12) for accommodating and mounting a pressure difference sensing device (18) which can sensing the fluid pressure at the divergent portion of the tubular main-body (11) through the penetrating hole (16) which is arranged as close as possible to the neck portion of the tubular main-body (11).

Meanwhile in order to enable the upper side of the pressure difference sensing device (18) to sense the pressure head ($P_1$) at the fluid inlet (13) transmitted through the penetrating hole (15), a passage groove (19) is formed on the surface of the platform (12), and is connected to the penetrating hole (15) and upper side of the pressure difference sensing device (18), and then a cover plate (17) is tightly mounted on the upper side of the platform (12) that the upper side and the lower side of the pressure sensing device (18) can separately sense the pressure head ($P_1$) at the inlet (13) transmitted through penetrating hole (15) and the pressure head ($P_2$) at the outlet (14) near the neck portion transmitted through penetrating hole (16) to obtain the pressure difference ($P_1-P_2$) which shall be transmitted to the microcomputer for calculating the flow rate and flow speed.

However, this type of conventional flow meter (10) has three drawbacks as follows:

First, the conventional type flow meter (10) employs only one sensing device (18) to measure the pressure difference ($P_1-P_2$) produced at a point near the neck portion of tubular main-body (11). Since the upper side and lower side of the pressure difference sensing device (18) both have to sustain the pressure head ($P_1$) and pressure head ($P_2$) at the same time, malfunction always occurs due to inability of sustaining the pressure difference variation, and the service life of the conventional type flow meter (10) is therefore largely reduced to result in a poor economic effectiveness.

Second, on the upper side of the platform (12) of the tubular main-body (11) of the conventional type flow meter (10) a horizontal passage groove (19) must be provided. However, since the passage groove (19) is perpendicular to the penetrating hole (15) on the platform a distortion of measurement of the pressure head ($P_1$) sensed by the pressure sensing device (18) is always resulted in, and actually the flow rate and flow speed measured by the conventional type flow meter are inaccurate.

Third, since a passage groove (19) is formed on the upper side of the platform (12) of the conventional type flow meter (10), a cover plate (17) must be mounted on, and tightly seal the upper side of the platform (12). However, the pressure head ($P_1$) at the fluid inlet (13) transmitted through the penetrating hole (15) on the platform (12) is sometimes greater than the fastening force for tightly holding the cover plate (17) on the platform (12), that results in the damage or crack of the cover plate (17) due to inability of sustaining the pressure head ($P_1$). This will cause the failure of operation of conventional type flow meter (10).

SUMMARY OF THE PRESENT INVENTION

Therefore, as concluded from the above, the major purpose of the invention is to improve the drawbacks of the conventional type flow meter by arranging two pressure sensing devices instead of one pressure sensing device on the flow meter, and each of the two pressure sensing devices shall individually and separately sense the fluid pressure at the inlet and outlet of the flow meter that can precisely measure the pleasure difference at a point near the throat portion produced by the fluid pressure at the inlet and outlet of the flow meter so as to completely solve the problem of the conventional type flow meter caused by employing only one pressure difference sensing device, and increase the service life as well as the measuring accuracy of the flow meter.

Another purpose of the invention is to provide a new flow meter structure which comprises a tubular main-body having an internal venturi tube structure and two pressure sensing devices. Since each of the two pressure sensing devices is arranged to measure the pressure head at the inlet and outlet of the venturi tube individually and separately, each sensing device can therefore sustain wide range of variation of pressure difference; particularly the two pressure sensing devices are mounted directly on a printed circuit board, and are tightly packed with soft rubber material. The printed circuit board is then fastened on the outer side of the tubular main-body by fastening screw. In addition to using the printed circuit board as the cover plate of the tubular main-body, the printed circuit board can also forms the flow meter with tubular main-body having considerably strong structure. Besides, since the arrangement of the pressure sensing device of the flow meter has a structure of specific design, the ability to sustain fluid pressure, the measuring accuracy and service life all are improved, and the occurrence of malfunction is decreased that largely enhanced the applicability of the flow meter.

The minor purpose of the invention is to provide a multiple function flow meter by incorporating a TDS water quality tester to the tubular main-body of the flow meter which when measuring the flow rate of the tap water, spring water, mineral water and different kinds of packed water the water quality such as purity and hardness can also be tested at the same time.

BRIEF DESCRIPTION OF THE DRAWING FIGURES

DETAILED DESCRITION OF THE PREFERRED EMBODIMENTS

Figure 1:
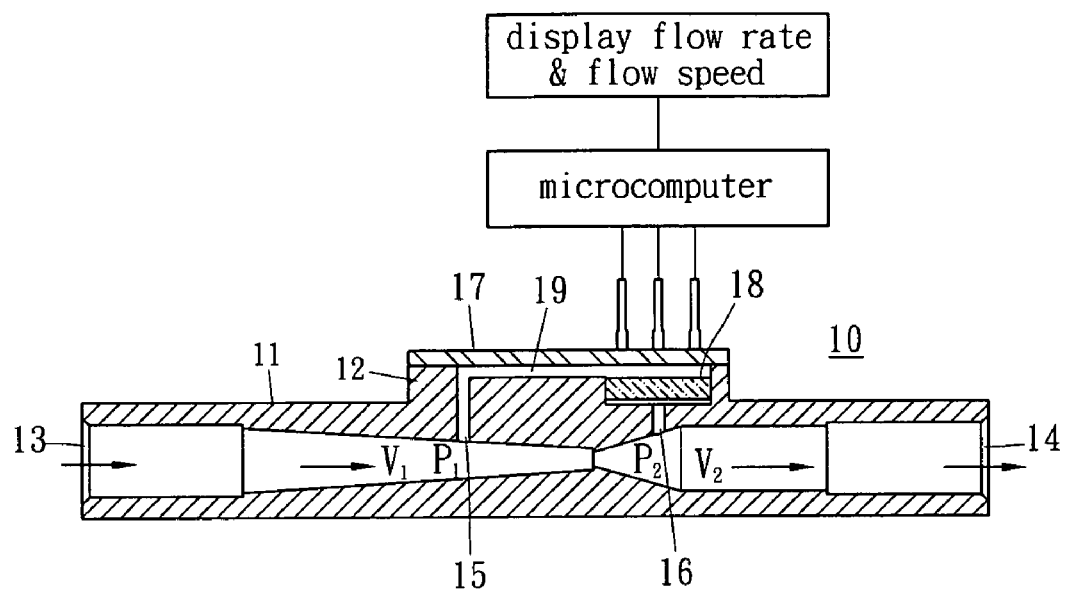
FIG. 1 is a sectional view and schematic drawing of a conventional type flow meter.
Figure 2:
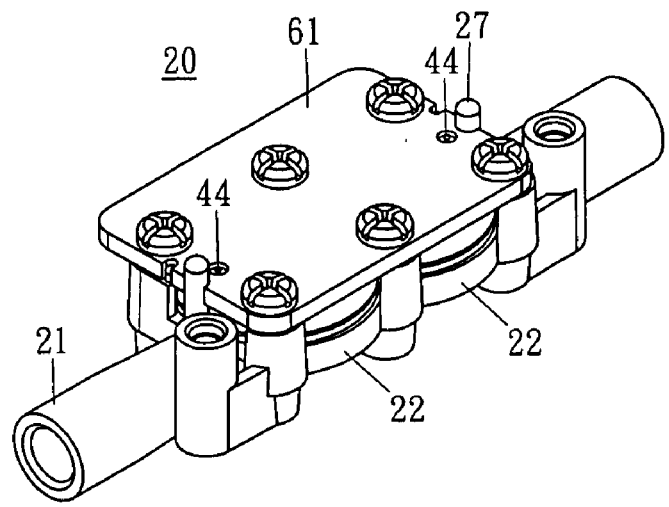
FIG. 2 is the three-dimensional drawing of a flow meter disclosed in the invention.

As shown in FIG. 2 through FIG. 7, the basic structure of the flow meter (20) disclosed in the invention comprises a tubular main-body (21) and a cover plate (60) carrying two pressure sensing device (50) mounted on one side. And the most preferred embodiment of the invention is to have the cover plate (60) formed with a printed circuit board and two pressure sensing devices (50) installed on the printed circuit board.

Figure 4:
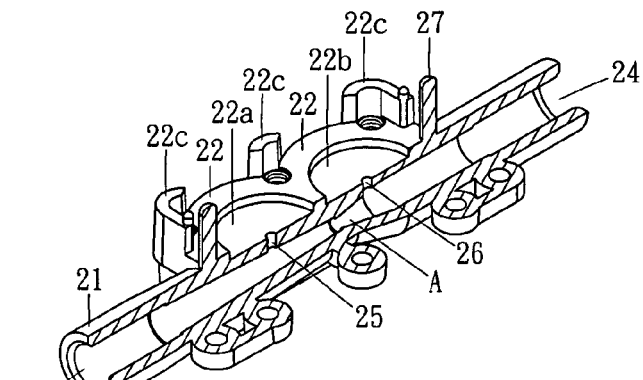
FIG. 4 is a three-dimensional partial-sectional drawing of tubular main-body of the flow meter shown in FIG. 2.

As shown in FIG. 4, the tubular main-body (21) has its inner side formed into a venturi tube structure which has a throat portion (A), i.e., the inlet portion (23) of the tubular main-body (21) is in convergent shape, and the outlet portion (24) of the tubular main-body (21) is in divergent shape, and between the convergent and divergent portion is the throat (A) of the venturi tube.

Figure 3:
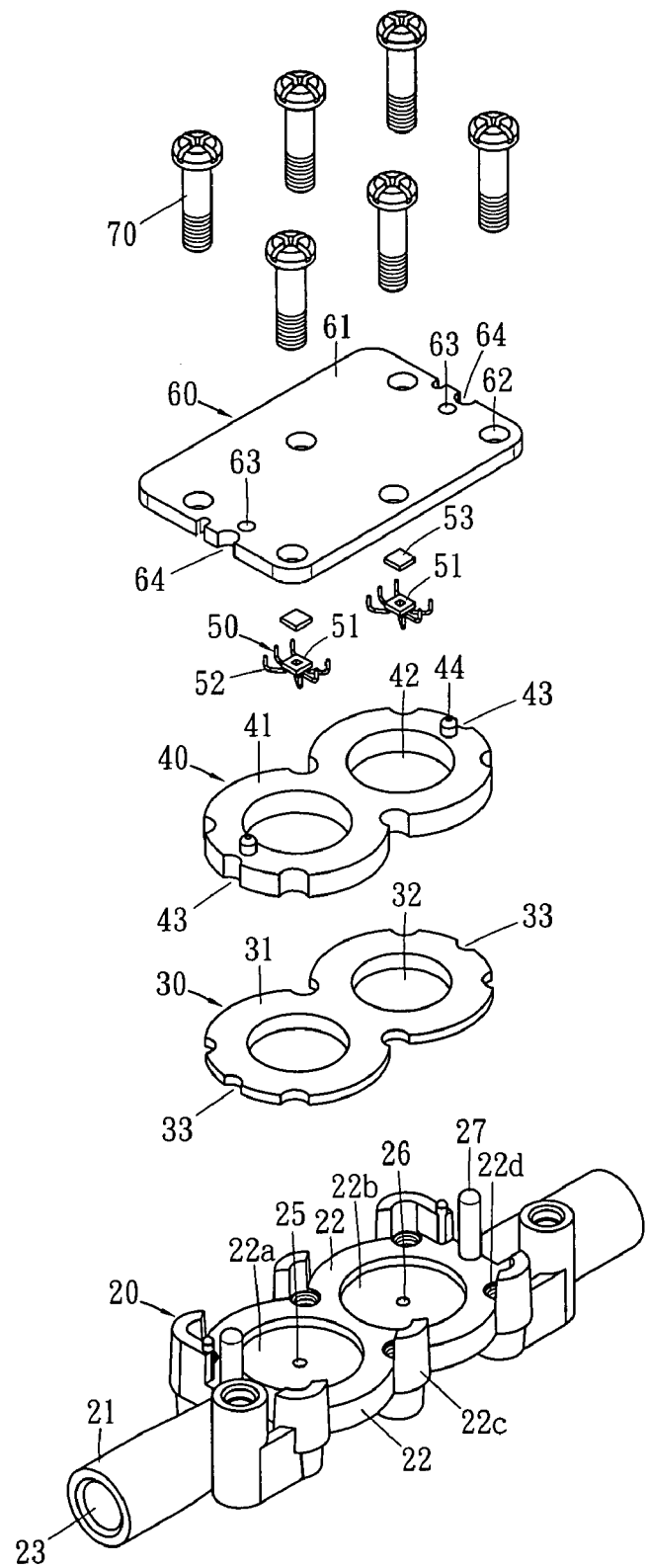
FIG. 3 is an exploded drawing of the flow meter shown in FIG. 2.

As shown in FIG. 3 and FIG. 4, the tubular main-body (21) has a seat (22) which has a recession formed on its upper surface. However in the preferred embodiment of the invention the recession is divided into two independent recessions (22a) and (22b), and a small penetrating hole (25) is arranged on the bottom of the recession (22a) to connect the convergent portion of the fluid inlet (23) of the tubular main-body (21), while another small penetrating hole is arranged on the bottom of the recession (22b) to connect the divergent portion of the outlet (24) of the tubular main-body (21) and close as much as possible to the throat (A) of the venturi tube.

In order to enable the seat (22) of the tubular main-body (21) to provide the function for aligning the parts and components during installation and to strengthen the structure of seat (22), the aligning pins (27) are provided on seat (22), or aligning wall (22c) surrounding the seat (22) can be further provided for accommodating a leak prevention rubber sheet (30).

The main-body (31) of the leak prevention rubber sheet (30) has two separate holes (32) positioned corresponding to the position of the recessions (22a) and (22b) formed on seat (22) of the tubular main-body (21). When the leak prevention rubber sheet (30) is installed on the surface of the seat (22) the gap between the recession (22a) and (22b) formed on the seat (22) can be eliminated, and leak prevention effect can be achieved.

Aligning indentations (33) are provided along the circumference of the leak prevention rubber sheet (30) and positioned corresponding to the aligning pin (27) on the seat (22) of the tubular main-body (21). When the leak prevention rubber sheet (30) is installed on the seat (22), the aligning indentation (33) on the leak prevention rubber sheet (30) and the aligning pin (27) on the seat (22) of the tubular main-body (21) can guide each other during installation to mount the leak prevention rubber sheet (30) in correct position for achieving the effect of leak prevention.

Figure 5:
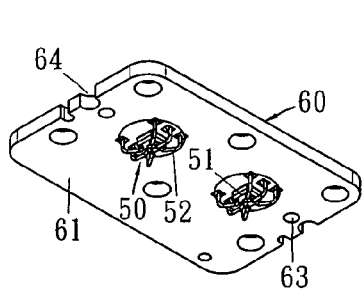
FIG. 5 is a schematic drawing showing the arrangement of two pressure sensing devices which are directly installed on the cover plate formed with a printed circuit board.

Referring to FIG. 3 and FIG. 5, the cover plate (60) has a main-body (61) formed by printed circuit board having aligning indentations (64) arranged along the circumference and positioned corresponding to the aligning pin (27) on the seat (22) of the tubular main-body (21). When mounting the cover plate (60) the aligning indentation (64) of the cover plate (60) and the aligning pin (27) on the seat (22) of the tubular main-body (21) can align and guide each other for mounting the cover plate (60) into correct position on seat (22) of the tubular main-body (21).

Figure 7:
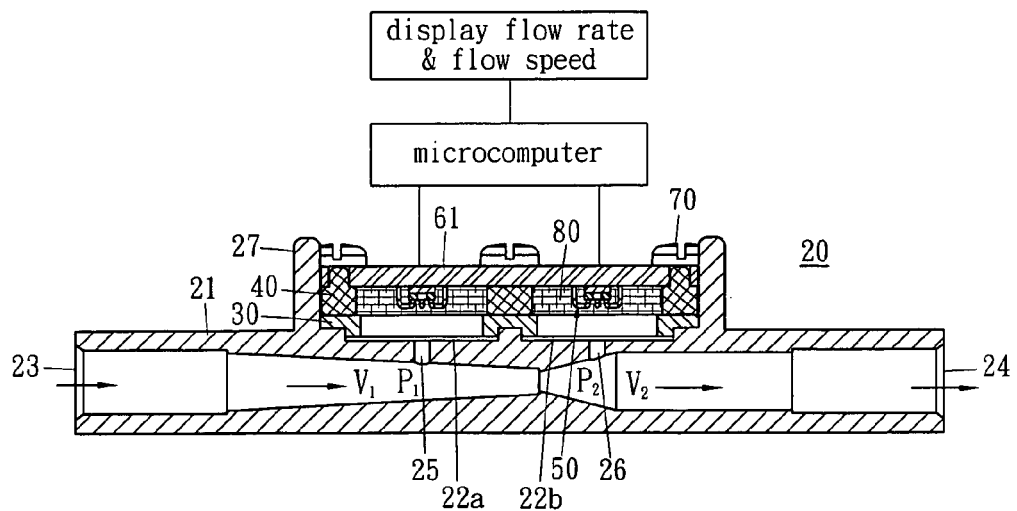
FIG. 7 is a sectional and schematic drawing showing the application of the flow meter shown in FIG. 2.

Also referring to FIG. 3 and FIG. 7, the seat (22) of the tubular main-body (21) has several screw holes (22d) positioned corresponding to the fastening holes (62) on the main-body (61) of the cover plate (60). When the cover plate (60) is correctly mounted on the seat (22) of the tubular main-body (21), the whole assembly of cover plate (60) and tubular main-body (21) is tightly joined together by means of fastening screws (70) to form the assembly as a complete unit of flow meter (20) of the invention.

Besides, since the cover plate (60) and the tubular main-body (21) of the flow meter (20) are joined together by means of fastening screws (70) to form a complete unit, but not by adhesive or any other kinds of bonding agent, the capacity of bearing pressure to the flow meter (20) is increased that can prevent the cover plate (60) from damage or crack due to fluid pressure. In addition, by employing the tightening force of the tightening screw (70) the leak prevention rubber sheet (30) between the cover plate (60) and the seat (22) of the tubular main-body (21) can be tightly fixed to achieve the effect of leak prevention.

Figure 6:
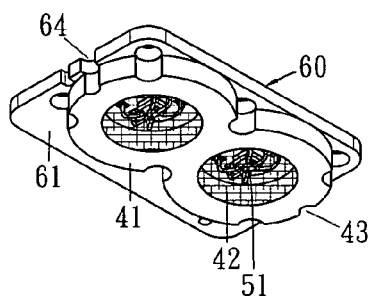
FIG. 6 is a schematic drawing of the cover plate shown in FIG. 5 which shows a rubber filling plate adhered to the cover plate and the pressure sensing devices packed with soft rubber material.

As shown in FIG. 3, FIG. 5 and FIG. 6, the two pressure sensing devices (50) both have high-sensitivity pressure sensitive chip (51) as the major element, and are installed on the main-body (61) of the cover plate (60) by means of jump connection leading-out wire (52) and glass plate (53) to form electric connection with the printed circuit on the cover plate (60).

And, the two pressure sensing devices (50) are tightly packed inside the soft rubber material (80) which, when the flow meter is used to test the fluid flow, can completely prevent the pressure sensing device (50) from contacting with the fluid, but can sense, and measure the pressure of the fluid transmitted through the soft rubber material (80).

As shown in FIG. 3 and FIG. 6, in order to have the pressure sensing device (50) completely and tightly packed inside the soft rubber material (80) one of the example of embodiment of the invention chooses to adhere a rubber filling plate (40) on the main-body (61) of the cover plate (60) before applying the soft packing rubber material (80), i.e., the rubber filling plate (40) is correctly installed on the main-body (61) of the cover plate (60) and two pressure sensing devices (50) on the main-body (61) of the cover plate (60) are accommodated inside the recessions (42) on the main-body (41) of the rubber filling plate (40), and then the soft rubber material (80) is filled into the recessions (42) to completely and tightly pack the pressure sensing device (50).

Figure 9:
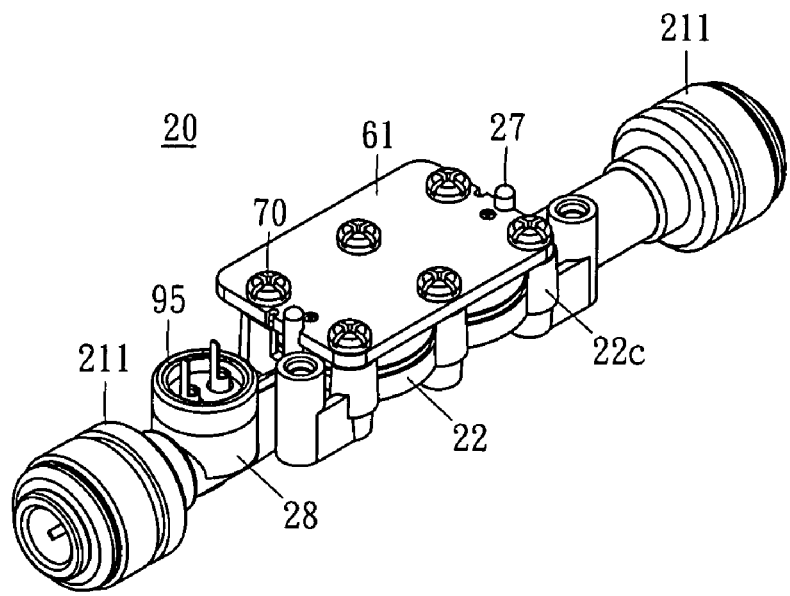
FIG. 9 is three-dimensional drawing of the third example of embodiment of the flow meter disclosed in the invention showing a TDS water quality tester incorporated to the tubular main-body.

As shown in FIG. 3, FIG. 6 and FIG. 9, the rubber filling plate (40) has aligning indentations (43) along the circumference with position arranged corresponding to the aligning pin (27) on the seat (22) of the tubular main-body (21), therefore, after the rubber filling plate (40) is adhered to the main-body (61) of the cover plate (60) the aligning indentation (64) on the cover plate (60), the aligning indentation (43) on the rubber filling plate (40) and the aligning pin (27) can be employed to align each other, and the aligning pin (27) will serve as a guide to enable a correct installation of the cover plate (60) and the rubber filling plate (40) on the seat (22) of the tubular main-body (21), so that the rubber filling plate (40) can be evenly and tightly mounted on the leak prevention rubber sheet (30) to achieve the desired leak prevention effect when the cover plate (60) and the tubular main-body (21) are tightened by tightening screw (70) to form a complete unit.

Further, in order to correctly and easily mount and adhere the rubber filling plate (40) on the cover plate (60), aligning holes (63) are provided on the main-body (61) of the cover plate (60), and aligning pins (44) are provided on the main-body (41) of the rubber filling plate (40) positioned corresponding to the aligning holes (63) on the cover plate (60).

Therefore, the installation of the rubber filling plate (40) can be made in such a way that after applying the adhesive on the main-body (41), the rubber filling plate (40) can be mounted on the cover plate by inserting the aligning pin (44) into the aligning hole (63) on the cover plate (60) to achieve the purpose of easily to adhere the rubber filling plate (40) on correct position.

As concluded above, when the cover plate (60) and the tubular main-body (21) are assemble together to form the flow meter (20) of this invention as shown in FIG. 7, the two pressure sensing devices (50) are located separately at the upper side of the recession space (22a) and (22b) on the seat (22) of the tubular main-body (21), and are tightly packed inside the soft rubber material (80). Therefore, only one side of each pressure sensing device (50) bears fluid pressure especially without contact with fluid, thus the pressure sensing device (50) can bear even wider range of variation of fluid pressure.

Moreover, since the cover plate (60) of the invention is a printed circuit board which directly forms electric connection with the pressure sensing device, the measuring signal loss or distortion is decreased, and the measuring accuracy of the flow meter (20) is increased.

As shown in FIG. 7, the flow meter (20) of this invention employs two pressure sensing devices (50) on cover plate (60) to sense separately the pressure head $P_1$ at fluid inlet (23) transmitted through penetrating hole (25) on the tubular main-body (21) and the pressure head $P_2$ at fluid outlet (24) transmitted through penetrating hole (26) near throat (A), and then the measured pressure head $P_1$ and $P_2$ are sent to a microcomputer through cover plate (60) to calculate the value of pressure difference ($P_1$–$P_2$) and convert the pressure difference value into flow rate and flow speed, and then display the calculated value on digital display.

Figure 8:
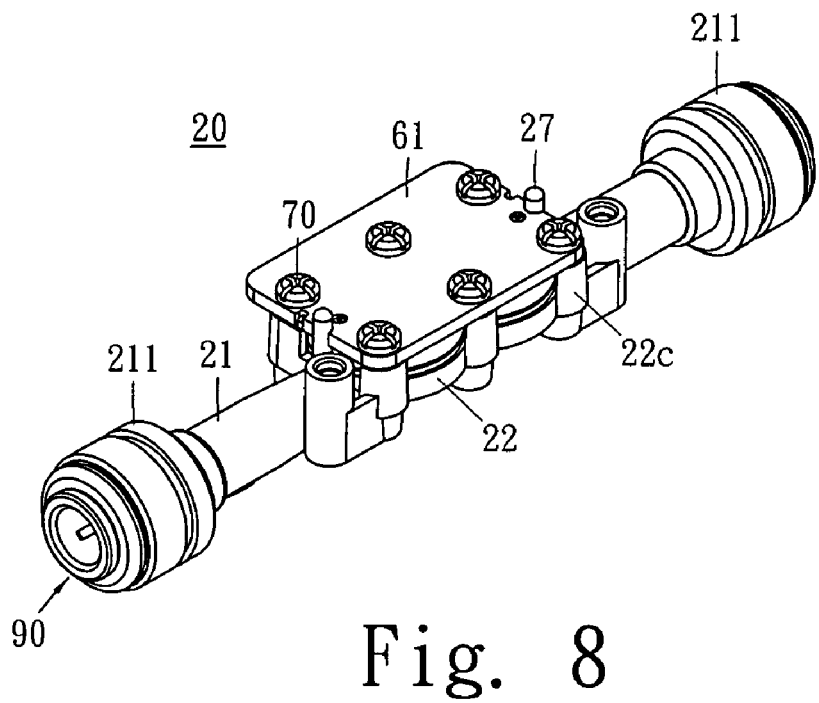
FIG. 8 is a schematic drawing of the second embodiment of the flow meter disclosed in the invention which schematically shows that both ends of the tubular main-body are formed into connecting ends special for mounting the quick coupling.

As shown in FIG. 8, another embodiment of the flow meter (20) disclosed in this present invention may have connecting means (211) on either end or both ends for mounting a set of quick coupling (90) that enables the flow meter (20) to further have the function of quick connection. The connecting means (211) may be formed in the form of inner screw thread or outer screw thread to enable a screw-thread connection between the flow meter (20) and the fluid piping system.

As shown in FIG. 9, further another embodiment of the flow meter (20) disclosed in this present invention can further have a seat (28) formed on the outer surface of the tubular main-body (21) for mounting a TDS (Total Dissolved Solids) water quality tester (95) for testing total dissolved solids of pollutant, impurity and unknown chemical material contained in the water that enables the flow meter (20) to possess the function of testing water hardness and water purity.

When the flow meter (20) disclosed in the present invention is employed for testing the flow rate of tap water, sprint water, mineral water and different kinds of packed water the hardness as well as the purity of these kinds of water can also the tested at the same time.

What is claimed is:

1. A flow meter comprising a tubular main-body and a cover plate carrying two pressure sensing devices on one side, wherein the tubular main-body has a venturi tube structure inside having an inlet of convergent shape and an outlet of divergent shape, and a seat is formed on outer surface of the tubular main-body having two separate recessions each of which has a penetrating hole connected separately to the convergent portion and divergent portion of the tubular main-body; the cover plate is mounted on the seat to form a cover to the seat; and the two pressure sensing devices carried on the cover plate are completely and tightly packed with silicon rubber and located separately above the corresponding penetrating hole on the tubular main-body;
   wherein the cover plate provides a rubber filling plate with two recessions on the bottom side, and the two pressure sensing devices carried on the cover plate are located separately in the two recessions of the rubber filling plate, and each of recessions is filled with silicon rubber for packing the pressure sensing devices.

2. The flow meter as defined in claim 1, wherein the cover plate is a printed circuit board and the two pressure sensing devices are electrically connected with the printed circuit.

3. The flow meter as defined in claim 2, wherein the seat of the tubular main-body has an aligning wall formed surrounding upper surface of the seat, and has a leak prevention sheet installed in the space surrounded by the aligning wall.

4. The flow meter as defined in claim 3, wherein both ends of the tubular main-body are formed into connecting-ends for installing a quick coupling.

5. The flow meter as defined in claim 3, wherein the tubular main-body is incorporated with a TDS water quality tester mounted on the outer surface of the tubular main-body.

6. The flow meter as defined in claim 2, wherein the cover-plate has aligning holes on the bottom side, and the rubber filling plate has aligning pins corresponding to said aligning holes, and the aligning pins are inserted in the aligning holes.

7. The flow meter as defined in claim 2, wherein both ends of the tubular main-body are formed into connecting-ends for installing a quick coupling.

8. The flow meter as defined in claim 7, wherein the tubular main-body is incorporated with a TDS water quality tester mounted on the outer surface of the tubular main-body.

9. The flow meter as defined in claim 2, wherein the tubular main-body is incorporated with a TDS water quality tester mounted on the outer surface of the tubular main-body.

10. The flow meter as defined in claim 1, wherein the seat of the tubular main-body has an aligning wall formed surrounding upper surface of the seat, and has a leak prevention sheet installed in the space surrounded by the aligning wall.

11. A flow meter comprising a tubular main-body and a cover plate carrying two pressure sensing devices on one side, wherein the tubular main-body has a venturi tube structure inside having an inlet of convergent shape and an outlet of divergent shape, and a seat is formed on outer surface of the tubular main-body having two separate recessions each of which has a penetrating hole connected separately to the convergent portion and divergent portion of the tubular main-body; the cover plate is mounted on the seat to form a cover to the seat; and the two pressure sensing devices carried on the cover plate are completely and tightly packed with silicon rubber and located separately above the corresponding penetrating hole on the tubular main-body;

wherein the cover plate is a printed circuit board and the two pressure sensing devices are electrically connected with the printed circuit; and wherein the seat of the tubular main-body has an aligning wall formed surrounding upper surface of the seat, and has a leak prevention sheet installed in the space surrounded by the aligning wall.

12. The flow meter as defined in claim 11, wherein the cover-plate has aligning holes on the bottom side, and the rubber filling plate has aligning pins corresponding to said aligning holes, and the aligning pins are inserted in the aligning holes.

13. The flow meter as defined in claim 11, wherein both ends of the tubular main-body are formed into connecting-ends for installing a quick coupling.

14. The flow meter as defined in claim 13, wherein the tubular main-body is incorporated with a TDS water quality tester mounted on the outer surface of the tubular main-body.

15. The flow meter as defined in claim 11, wherein the tubular main-body is incorporated with a TDS water quality tester mounted on the outer surface of the tubular main-body.

16. A flow meter comprising a tubular main-body and a cover plate carrying two pressure sensing devices on one side, wherein the tubular main-body has a venturi tube structure inside having an inlet of convergent shape and an outlet of divergent shape, and a seat is formed on outer surface of the tubular main-body having two separate recessions each of which has a Penetrating hole connected separately to the convergent portion and divergent portion of the tubular main-body; the cover plate is mounted on the seat to form a cover to the seat; and the two pressure sensing devices carried on the cover plate are completely and tightly packed with silicon rubber and located separately above the corresponding penetrating hole on the tubular main-body;

wherein the cover plate is a printed circuit board and the two pressure sensing devices are electrically connected with the printed circuit; and wherein both ends of the tubular main-body are formed into connecting-ends for installing a quick coupling.

17. The flow meter as defined in claim 16, wherein the tubular main-body is incorporated with a TDS water quality tester mounted on the outer surface of the tubular main-body.

18. A flow meter comprising a tubular main-body and a cover plate carrying two pressure sensing devices on one side, wherein the tubular main-body has a venturi tube structure inside having an inlet of convergent shape and an outlet of divergent shape, and a seat is formed on outer surface of the tubular main-body having two separate recessions each of which has a penetrating hole connected separately to the convergent portion and divergent portion of the tubular main-body; the cover plate is mounted on the seat to form a cover to the seat; and the two pressure sensing devices carried on the cover plate are completely and tightly packed with silicon rubber and located separately above the corresponding penetrating hole on the tubular main-body;

wherein the cover plate is a printed circuit board and the two pressure sensing devices are electrically connected with the printed circuit; and wherein the tubular main-body is incorporated with a TDS water quality tester mounted on the outer surface of the tubular main-body.

* * * * *